United States Patent [19]
Braband

[11] Patent Number: 6,058,168
[45] Date of Patent: May 2, 2000

[54] METHOD AND MICROCOMPUTER SYSTEM FOR THE AUTOMATIC, SECURE AND DIRECT TRANSMISSION OF DATA

[75] Inventor: Martin Braband, Berlin, Germany

[73] Assignee: TIXI.COM GmbH Telecommunication Systems, Berlin, Germany

[21] Appl. No.: 09/101,082

[22] PCT Filed: Dec. 20, 1996

[86] PCT No.: PCT/DE96/02489

§ 371 Date: Jun. 29, 1998

§ 102(e) Date: Jun. 29, 1998

[87] PCT Pub. No.: WO97/24825

PCT Pub. Date: Jul. 10, 1997

[30] Foreign Application Priority Data

Dec. 29, 1995 [DE] Germany .............. 195 49 307

[51] Int. Cl.[7] .................................................. H04M 11/00
[52] U.S. Cl. .................... 379/93.24; 379/93.02; 379/93.05
[58] Field of Search .............. 379/93.02–93.08, 379/93.24–93.28, 90.01, 110.01

[56] References Cited

U.S. PATENT DOCUMENTS 5,379,340  1/1995  Overend et al. .

FOREIGN PATENT DOCUMENTS

| | | |
|---|---|---|
| 0671831 | of 0000 | European Pat. Off. . |
| 0413537 | 2/1991 | European Pat. Off. . |
| 0671831 | 9/1995 | European Pat. Off. . |
| 04054756 | 2/1992 | Japan . |
| 9014726 | 11/1990 | WIPO . |
| 9320647 | 10/1993 | WIPO . |
| WO95/25395 | 9/1995 | WIPO ................. 379/93.24 |

OTHER PUBLICATIONS

"Entlastung des zentralen Rechners durch frei programmierbare Nachrichtenübertragungssteuerungen?" (bürotechnik, Automation + Organisation, Nov. 1972, pp. 1348–1356).

Electronics & Wireless World, Bd. 91, Nr. 1594, Aug. 1985, Surrey GB, Seiten 33–38, M. Allard, et al.: "Electronic Mailbox".

*Primary Examiner*—Wing F. Chan
*Attorney, Agent, or Firm*—Christie, Parker & Hale, LLP

[57] ABSTRACT

A method for automatic, direct and secure data transfer, in particular for the transmission of electronic mail includes transmitting data from a first terminal to a first microcomputer system, which is directly assigned to the first terminal. The data is processed in the first microcomputer system and transmitted, either immediately or subsequently over a data transmission line, directly to a second microcomputer system, which is directly assigned to the second terminal device. The data is processed in the second microcomputer system and transmitted either immediately or subsequently to the second terminal device. The microcomputer systems receive, send, store or process data regardless of the operational status of the first terminal device or second terminal device. The invention allows direct and automatic data transfer, i.e., without the engagement of a central computer between the terminals (e.g. PCs) on a data transfer path. Further, the process according to the invention and the microcomputer system according to the invention have numerous facilities for improving data security.

29 Claims, 3 Drawing Sheets

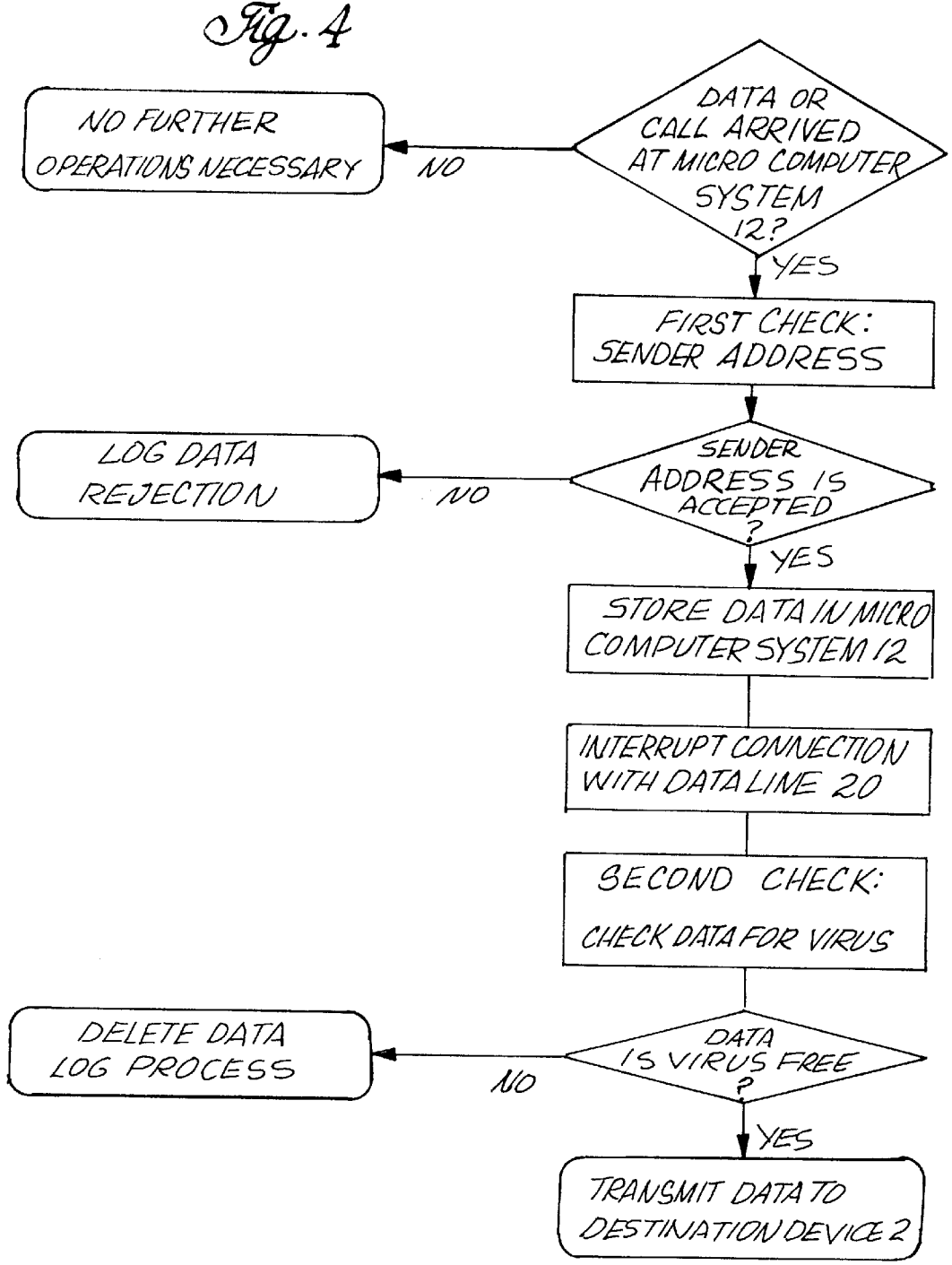

METHOD AND MICROCOMPUTER SYSTEM FOR THE AUTOMATIC, SECURE AND DIRECT TRANSMISSION OF DATA

FIELD OF THE INVENTION

The invention relates to a method and a microcomputer system for the automatic, secure and direct transmission of data.

BACKGROUND OF THE INVENTION

An increasing quantity of information is being exchanged today between computers (e.g. personal computers) by terminal users. The transfer of straightforward text in the form of electronic mail has traditionally played a leading role in this connection. But nowadays other forms of information including fax, audio, pictorial and video information as well as other types of computer data such as programs, data from databanks, measurement data and much more are being exchanged between computers. In view of this, the term "electronic mail" is used below to denote the exchange of data in any form between computers.

A disadvantage is that, in contrast with fax or telephone communications, the delivery of electronic mail directly to the user of a terminal device (e.g. the user of a PC on the Internet) requires substantial resources. Direct and automatic data transfer between a sending terminal device and a receiving terminal device is very complex as both terminal devices, or a central computer acting as an intermediate store, must be switched on and certain programs must be running on the computers to control the data exchange.

For security reasons (e.g. data security, security against system failure), central computers are thus generally unable to perform any other tasks and they must run day and night. Such "round-the-clock" systems are nowadays used mainly at an internal level by companies between their data processing networks at different locations (so-called routers or mail servers). They are also used today for connecting terminal devices to worldwide networks such as the Internet.

Users of electronic mail are nowadays dependent on so-called service providers, for example, who provide "round-the-clock" relay stations for electronic mail transmission.

In the processes proposed hitherto, electronic mail is sent via a "sender post office" and a worldwide network of intermediate computer terminals to a "recipient post office". In contrast with the terminal device of the actual recipient, this "recipient post office" is always on-line. Furthermore, the post offices cannot be directly controlled by the terminal users. The electronic mail remains at the recipient post office until the recipient, who is sitting at a terminal device, collects it. In this respect, the recipient must either regularly inquire at the post office or initiate measures himself. Although the actual transmission of electronic mail is completed within mere seconds, urgent mail cannot be sent in this way at the present time because the sender does not know if and when the actual recipient will collect the mail.

Furthermore, the intermediate post offices are frequently overloaded due to the ever-increasing quantities of data. As a result, data transfer can often only occur with immeasurable delays. Taking into consideration such delays, uncertain receipt of mail by the recipient and poor data protection on the Internet, the merits of the rapidity of electronic mail is put into perspective.

Hitherto, terminal users have thus been unable to avail themselves of a fully automatic, straightforward, direct, reliable and secure system of data transfer between a sending terminal device and a receiving terminal device, akin to that which exists in the case of telephone and fax communications.

For example, a fax can nowadays be sent over a telephone line directly to a recipient within a very short space of time, and be printed without any assistance from that recipient. Furthermore, the sender receives a confirmation that the fax has been correctly received by the recipient. The processes for electronic mail transmission proposed hitherto do not have these merits. This is a further reason why the fax retains its significance, although the transmission thereof is in principle slower than the transmission of electronic mail.

In the case of both telephone calls and faxes, data are transferred directly from a terminal user on the sending side to a terminal user on the receiving side, whereby neither the sender nor the recipient requires the services of a third party.

In EP 0 671 831 A1 there is considered an installation for receiving data which is to be forwarded to a terminal device, such as a data processing or data conversion device. If data is input when the terminal is switched off, the installation switches on the terminal device by means of a control signal. The data is temporarily stored at least until the terminal device is on-line. A disadvantage here is that the installation only works in regard to the terminal devices being put on line. Further, the disadvantages of existing electronic mail transmission are not overcome by this installation.

The article "Entlastung des zentralen Rechners durch frei programmierbare Nachrichtenübertragungssteuerungen?" (bürotechnik, Automation+Organisation, November 1972, pages 1348–1356) describes a central computer to which user terminals are connected over telephone lines. Between the central computer and the terminals there is a control unit which is used to unburden the central computer. The control unit is described as the "front-end" for the central computer (back-end).

With the system described there is the drawback that an end user is entirely dependent on the central computer over which he has no influence. If, for example, a central computer goes down then all connected end users can neither send nor receive data via their data stations. Furthermore, there is an increased expense each time for the end user to log on to the central computer in order to read the data intended for him through his data station. The most serious disadvantage however is the fact that the end user receives no notification at a data station if certain data has come in for him while his data station or central computer is switched off or is not ready for operation.

From the publication "Electronic Mailbox" in Electronics & Wireless World Vol.91, No. 1594, August 1985, Surrey, pages 33–38, an apparatus and process are described for the direct electronic data transfer between two end appliances. Microcomputer systems are thereby used which are associated with the end appliances wherein the microcomputer systems can temporarily store incoming data irrespective of the operating state of the end appliances. Apart from a direct data transfer between two end appliances, no measures or devices are described by which the security of the data transfer or that of the end appliances could be increased.

WO A 93/20647 relates to a microcomputer system which is connected between a data line and an end appliance. More particularly, this microcomputer system is to temporarily store incoming and outgoing data and to carry out a conversion between different data formats. No special safety features can be drawn from this printed specification either.

U.S. Pat. No. 5,379,340 relates to a communications system wherein incoming data is checked at a terminal to see whether it has been fully transferred. A log file is thereby set up to serve as a type of certificate of receipt for the data received. Furthermore, the teaching of this specification contains no means for increasing the data security.

SUMMARY OF THE INVENTION

Based on this prior art, the object of the present invention is to provide a method and device for the direct data transfer between two end appliances wherein one end appliance is protected from receiving undesired or harmful data in order to increase the security of the data transfer and end appliance.

The method according to the invention allows a direct data transfer between two end appliances (e.g. a PC of one end user) of a data transmission path. A direct data transfer here means that data is transferred directly from one end user to another end user without, for example, having to call on the services of a provider.

One microcomputer system according to the invention is thereby associated directly with the receiver apparatus, the second end appliance, whereby the microcomputer system is connected simultaneously to the end appliance and a data line (e.g. telephone line) or only to a data line. In the latter case, the end appliance (e.g. a laptop) is uncoupled from the microcomputer system so that the microcomputer system functions as a "quasi-answering machine" for the end appliance. The microcomputer system according to the invention is an autonomous unit which can receive, send, store or process data independently of the operating state of the end appliances.

End appliances are generally computers or computer systems which are located in the immediate access area of the end user. In addition to the microcomputer systems according to the invention, monitors, printers, hard discs, visual memory media or another peripheral apparatus can be connected to the second end appliance.

In particular, the public telephone network can be used as a data transfer network which increases the availability and reduces costs.

The microcomputer system according to the invention is associated directly with the end appliances, in the same way as, for example, an answering machine is associated directly with a telephone.

By using the autonomously operating microcomputer system it is possible to completely disconnect the processing of received data from the operating state of the end appliance.

The microcomputer system receives or processes data independently of the operating state of the associated end appliance. Even if, for example, the end appliance of the receiver is switched off, e.g. for energy saving reasons, data can be received or processed fully automatically by the directly associated microcomputer system. The end appliance also need not be permanently physically connected to the microcomputer system associated with it, which is of particular importance for the mobile end appliances which are widely used nowadays.

In this way, for example, notices can be automatically transferred from one microcomputer system to other computers without the sender end appliance having to be in operation or coupled to the microcomputer system. Electronic mail received from a microcomputer system can be processed and stored independently of the operating state of the associated end appliance.

A predeterminable processing of the data intended for the end appliance is carried out in the microcomputer system. Storage in the microcomputer system is always necessary when the data to be sent either cannot be or is not sent immediately to the data transfer network. Also, storage is necessary when the received data is only to be gathered first, when the associated receiver end appliance is either not ready to receive the data or the data transfer speed over the data transfer network is considerably slower than between the microcomputer system and the associated end appliance.

It is thereby essential that the buffer memory capacity of the microcomputer system associated with the end appliance eliminates the need for a memory through a "post office" within the data transfer network. Through the method according to the invention a direct data transfer is possible from a sender to a receiver without the need for a further channel, such as e.g. a service provider for processing or storing data. No special measures are required on the part of the sender and receiver for transferring data, such as, for example, an exchange with a mail server. The microcomputer system according to the invention is moreover compatible with the data transfer process used nowadays so that electronic mail can also be received from a service provider.

In order to increase security, the method according to the invention has some special method steps. Thus the data coming in at a receiver end appliance, the second end appliance, is checked by a microcomputer system according to predeterminable criteria.

Only if this first check has run through successfully is the incoming data processed or stored by the microcomputer system. This first check represents a first security step which is to prevent unauthorized data from being sent to the end appliance of the receiver or even access being gained to the end appliance. The microcomputer system thereby operates independently of the operating state of the second end appliance directly associated with it.

In order to improve the data security further, after the data has been entered into the microcomputer system, the data connection through which the microcomputer system has received the data is broken or cut off. Only at the end of the data connection is the data ready for transfer to an end appliance. Thus, there is never a direct connection between the end appliance and the data line. It is thus impossible for hackers, for example, who would like to gain access to the end appliance through an existing data connection to undertake manipulations on the end appliance.

With the method according to the invention, the data read by the microcomputer system is only processed after the interruption according to predeterminable processing instructions and/or second predeterminable criteria. Through the two-phase check or processing which is designed as a sluice principle for data, a substantially increased data security is reached for the end appliance.

In an advantageous development of the method according to the invention, data entering the microcomputer system and coming from a predeterminable sender is either refused or accepted. The sender can be recognized, for example, by his telephone number. In this way it is possible, for example, to suppress the receipt of undesired advertising messages.

It is also possible in a second check to undertake decoding or verification of an electronic signature. Only with a positive result of the second check (e.g. successful decoding, electronic signature in order) is the data transferred to the end appliance associated with the microcomputer system.

In a further advantageous embodiment of the method, the second check consists of checking for computer viruses in the data entered into the microcomputer system. This prevents data, which could under certain circumstances be harmful, from reaching the end appliance associated with the microcomputer system.

Advantageously data is compressed, decompressed, coded and decoded by the microcomputer system. Through compressing data it is possible to considerably reduce the amount of data to be transferred over the data line which reduces the length of transmission and thus lowers costs. By compressing data less memory space is taken up inside the microcomputer system. If data is retrieved from the microcomputer system, then it can be decompressed automatically if, for example, the retrieving station has no facilities for decompression. Coding the data which is sent over a data line considerably increases the data protection which is of special significance in business communications.

In one embodiment of the method, the data received by the microcomputer system is processed according to priority. To this end, certain data are provided with priority information such as for example with the reference "Urgent" or "Confidential".

In another excellent design of the method according to the invention the data received by the microcomputer system is sorted and/or processed according to predeterminable criteria. Thus, for example, data received from certain senders can be automatically canceled or directed onto other addresses.

In a further particularly advantageous development of the method, a direct access from the data line to the end appliance is impossible, since this becomes impossible through the associated microcomputer system. Through this sluice locking principle it is impossible for unauthorized personnel to produce a continuous data connection between the data line and the end appliance.

In a particularly advantageous design of the method according to the invention, the data originating in a first end appliance is provided with a name (log-in name) and a telephone number as the address details. Through this type of addressing the senders of electronic mail do not need to note a number of addresses since their known telephone numbers can be used as addresses.

In a particularly advantageous design of the method according to the invention, the microcomputer system automatically sends an announcement when it receives data. More particularly, an automatically sent announcement of this kind can be in the form of a certificate of receipt for the data received.

Advantageously a remote controlled processing of the data stored in the microcomputer system is carried out over the data line. It is furthermore advantageous to control the operating mode of the microcomputer system through remote control. Thus it is possible without starting up an end appliance not only to process the data stored in the microcomputer system but also to govern the automatic processing through the microcomputer system. This is of great importance if a user is, for a longer period of time, not in the immediate vicinity of his end appliance and the associated microcomputer system. It is thereby of particular advantage if only a predeterminable part of the data stored in the microcomputer system is processed or redirected. In this way it is, for example, possible through remote control to carry out a check on the data stored in a microcomputer system in order to transfer only the most important or only the short electronic mail sendings to a far-off user of the associated terminal.

It is also possible with particular advantage only to allow data which is provided, for example, with a certain tagging (e.g. "Confidential") to be displayed after a security question. In this way a user hierarchy can be established for the data stored in the microcomputer system so that certain users can access all data while other users can only access some of the data.

Advantageously the microcomputer system registers the input of data from predeterminable senders and automatically causes a return call to the sender in order to verify this. Only after a successful verification of the sender is the data transferred to the microcomputer system. By verifying the sender address, it is possible to improve the security in the transfer of data.

Furthermore, in a further advantageous design of the method according to the invention, through a display and/or acoustic signal transmitter of the microcomputer system, a notification is made when data is entered into the microcomputer system. It is thereby possible for a user to see, even when the end appliance is switched off, whether data has been sent to the microcomputer system which is associated with the end appliance.

A microcomputer system, according to the invention, for automatic and direct data transfer has at least a first interface through which it can be connected to an end appliance. The microcomputer system can be connected to a data line through at least a second interface. In particular a telephone network can be used as the data line. The microcomputer system has at least one processor system for controlling the function and at least one memory element for storing operating software, programs and data. Furthermore, the microcomputer system has a display and/or an acoustic signal transmitter for the data sent or received by the microcomputer system or the data stored in the microcomputer system. Thus the data transfer can be monitored entirely independently of the computer directly associated with the microcomputer system.

As opposed to a computer with different peripheral appliances the microcomputer system can be designed as a compact unit, whose processor system is flexibly programmable. Furthermore, the microcomputer system has no large energy consumer (e.g. monitor).

For these reasons a microcomputer system, according to the invention, can be used as an intelligent autonomous unit in the method for data transfer according to the invention. It is thus within the idea according to the invention to install the microcomputer system within another appliance, such as e.g. a fax machine which is attached to the same telephone line; a telephone, an answering machine or a modem.

The device according to the invention furthermore has check means through which a first check can be made on the incoming data for predeterminable criteria, and further means by which the data line can be interrupted. The data security is considerably improved through these means.

Furthermore the device according to the invention has interruption means through which the connection between the data line and the microcomputer system can be automatically interrupted. Also the microcomputer system according to the invention has processing means through which the data entered into the microcomputer system can be subjected to processing according to predeterminable processing modes and/or second predeterminable criteria. Thus direct access from the data line through the microcomputer system to the end appliance directly associated therewith is impossible.

In an advantageous design of the microcomputer system, the microcomputer system has check means for refusing or accepting incoming data from a predeterminable sender. In this way, undesired data transfer to the end appliance associated with the microcomputer system can be prevented. This serves inter alia to protect against computer viruses in data.

With particular advantage, the microcomputer system according to the invention, has processing means through which data stored in the microcomputer system can be checked for computer viruses. This additional check considerably increases data security.

The microcomputer system advantageously has processing means for compression, decompression, coding, decoding or converting data. Through these means the microcomputer system can process the data to be sent and the data received independently of the end appliance associated with the microcomputer system.

Furthermore it is advantageous if the operating mode of the microcomputer system and/or the data stored in same can be controlled by remote control operation.

The microcomputer system advantageously has means which automatically send either predeterminable notices or those automatically generated by the microcomputer. Thus, for example, certificates of receipt for electronic mail can be sent automatically without involving the end appliance associated with the microcomputer system or a system within the data transfer network.

Since with electronic mail a number of data formats are used, it is advantageous if a microcomputer system according to the invention has conversion means for different transmission protocols and/or data formats, more particularly for fax, language and/or image data.

It is likewise advantageous if the microcomputer system according to the invention has means to provide outgoing data with a name (e.g. log-in name) and telephone number as address details so that addressing the outgoing data is possible in a particularly simple manner.

BRIEF DESCRIPTION OF THE DRAWINGS

The invention will now be explained in detail with reference to various embodiments shown in the drawings in which:

FIG. 4 is a flow chart for a security check on data sent to a microcomputer system (floodgate principle for data).

DETAILED DESCRIPTION

Figure 1:
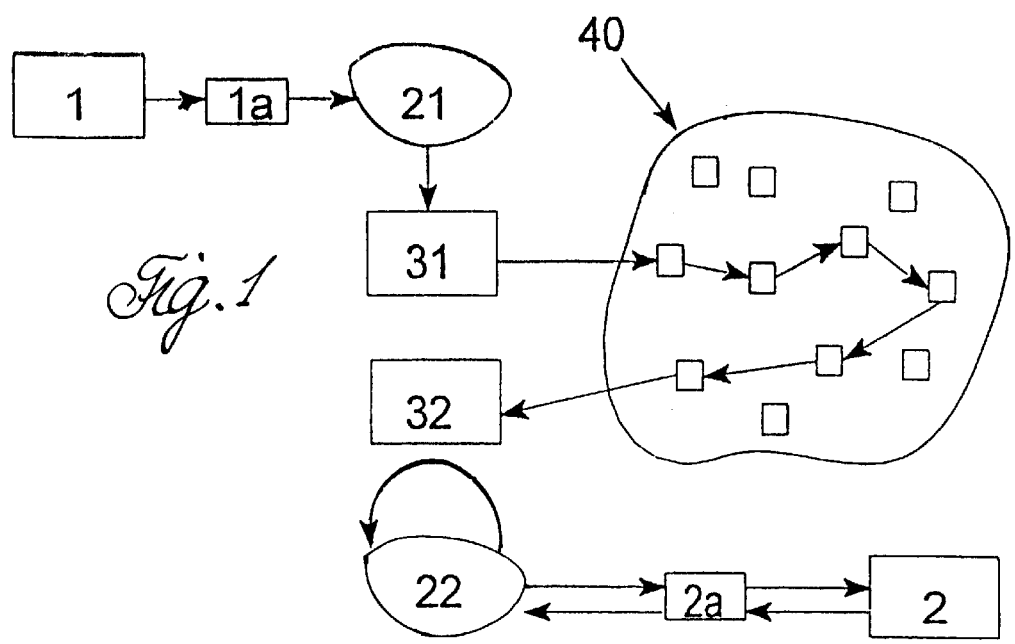
FIG. 1 is a sketch of the electronic mail transmission process over the Internet generally used hitherto.

FIG. 1 shows the electronic mail transfer process generally used hitherto. The term "electronic mail" is hereby used to denote data in binary, text, pictorial, audio or video format, etc.

The electronic mail is transferred between a first terminal device 1 and a second terminal device 2. In the example given in the illustration, the first terminal device 1 functions as a sender and the second terminal device 2 functions as a recipient. The terms "sender" and "recipient" are used below to denote the respective terminal devices at the ends of a data transfer path. In principle, it is possible for the roles of sender 1 and recipient 2 to be reversed, or even for both terminal devices 1 and 2 to send and receive data at the same time.

In this example, sender 1 and recipient 2 are personal computers with the generally associated peripheral devices such as printers and monitors.

Sender 1 and recipient 2 are connected to telephone networks 21 and 22 respectively through transfer devices 1a and 2a such as modems.

In the existing process, electronic mail cannot be transferred directly from sender 1 to recipient 2. Sender 1 is thus connected over telephone network 21 to a computer, which functions as a "sender post office" 31, i.e. it forwards data or, if the need arises, temporarily stores data. For this purpose the telephone number of a so-called service provider which operates sender post office 31 must be dialed. In order to fulfill its function, sender post office 31 must be constantly on-line, which means considerable monitoring and thus expense. Once a connection has been established with sender post office 31, the electronic mail is transferred to sender post office 31.

From sender post office 31, the electronic mail is transferred to a worldwide network 40 comprising an inestimably large number of linked computers. The exact path of the electronic mail is not clearly specified. In particular, it is normal for electronic mail within the worldwide network 40 to be temporarily stored in various computers. This not only increases the transfer time of the electronic mail, but also has a detrimental effect upon data security as the risk of unauthorized access to electronic mail is always greater if it is temporarily stored.

From worldwide network 40, the electronic mail is forwarded to a computer which operates as a recipient post office 32. In the same way as the sender post office 31, the recipient post office 32 must also be constantly on-line, which again means increased cost.

The electronic mail will now be stored at the recipient post office 32 until recipient 2 makes a specific inquiry at recipient post office 32 over a transmission device 2a. This is represented by the arch-shaped arrow in FIG. 1.

Recipient 2 is not informed of the arrival of an electronic mail item at his post office. This is now one of the most serious disadvantages of the Internet today. In order to collect the mail, recipient 2 must take special steps—always without knowing whether any post has even arrived for him. In this process of exchanging electronic mail, there is no direct, continuous and secure data transfer from sender 1 to recipient 2.

However, this is the normal way of receiving data on the Internet today. The only exceptions to this process are if the recipient operates an expensive continuous line to the Internet or if the recipient happens to be connected to his post office when the data arrives. Only in these two cases will the recipient receive the data as soon as it arrives at his post office.

On the whole, it is clear that the existing process for exchanging electronic mail incorporates a large number of different stages that have to be followed through. This requires considerable resources and results in unnecessary delays, costs and uncertainty. In particular, electronic mail items cannot just be received automatically as is the case with answering machines which nowadays receive telephone calls without any problem. In the case of fax transmission, data are also transmitted directly to the recipient and the faxes do not have to be collected from an intermediate storage location. The only pre-condition is that the answering machine or fax machine is constantly ready for use and connected to the telephone network.

Figure 2:
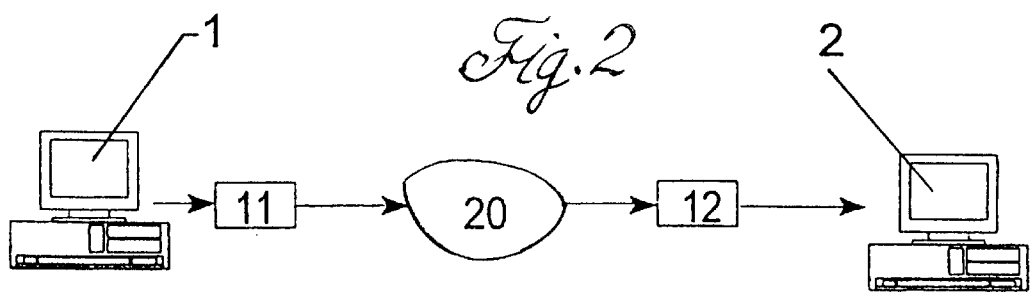
FIG. 2 is a sketch of the electronic mail transmission process according to the invention.

FIG. 2 shows the process according to the invention. As in the process shown in FIG. 1, this diagram also shows the transfer of electronic mail from sender 1 to recipient 2. In this case too, it is in principle possible to reverse the roles of sender 1 and recipient 2. In this example, sender 1 and recipient 2 are personal computers (terminal devices) at the end of a data transfer path with generally associated peripheral devices such as printers and monitors. It is within the spirit and scope of the invention that computers in local (company internal) computer networks could also be used as sender 1 or recipient 2.

The automatic and direct transfer of electronic mail by means of the process according to the invention takes place through microcomputer systems 11 and 12 according to the invention and a telephone network 20.

A first microcomputer system 11 is thereby directly assigned to sender 1 and a second microcomputer system 12 is directly assigned to recipient 2. This means that both sender 1 and recipient 2, as users, have direct access to the respectively assigned microcomputer systems 11 and 12.

The first microcomputer system 11 assigned to sender 1 does not have to be constantly connected to sender 1. Instead it need only be connected when data is to be exchanged with sender 1. The transfer of data can take place autonomously in line with the sending priorities of sender 1, for example, and/or it can be timed to take advantage of favorable telephone rates.

The second microcomputer system 12 assigned to recipient 2 does not have to be constantly connected to recipient 2. Instead it can receive electronic mail even when recipient 2 is not connected, for example, or is not ready to receive. If recipient 2 is ready to receive and is connected, microcomputer system 12 notifies recipient 2 that it wishes to send data because, for example, electronic mail has arrived. Recipient 2 then retrieves the data immediately or at a later stage.

Microcomputer systems 11 and 12 are thus autonomous devices constantly connected to telephone network 20 and situated in physical proximity to sender 1 and recipient 2, respectively. In each case the user of sender 1 or recipient 2 can access the assigned microcomputer systems 11 and 12, respectively, without engagement of third parties.

Figure 3:
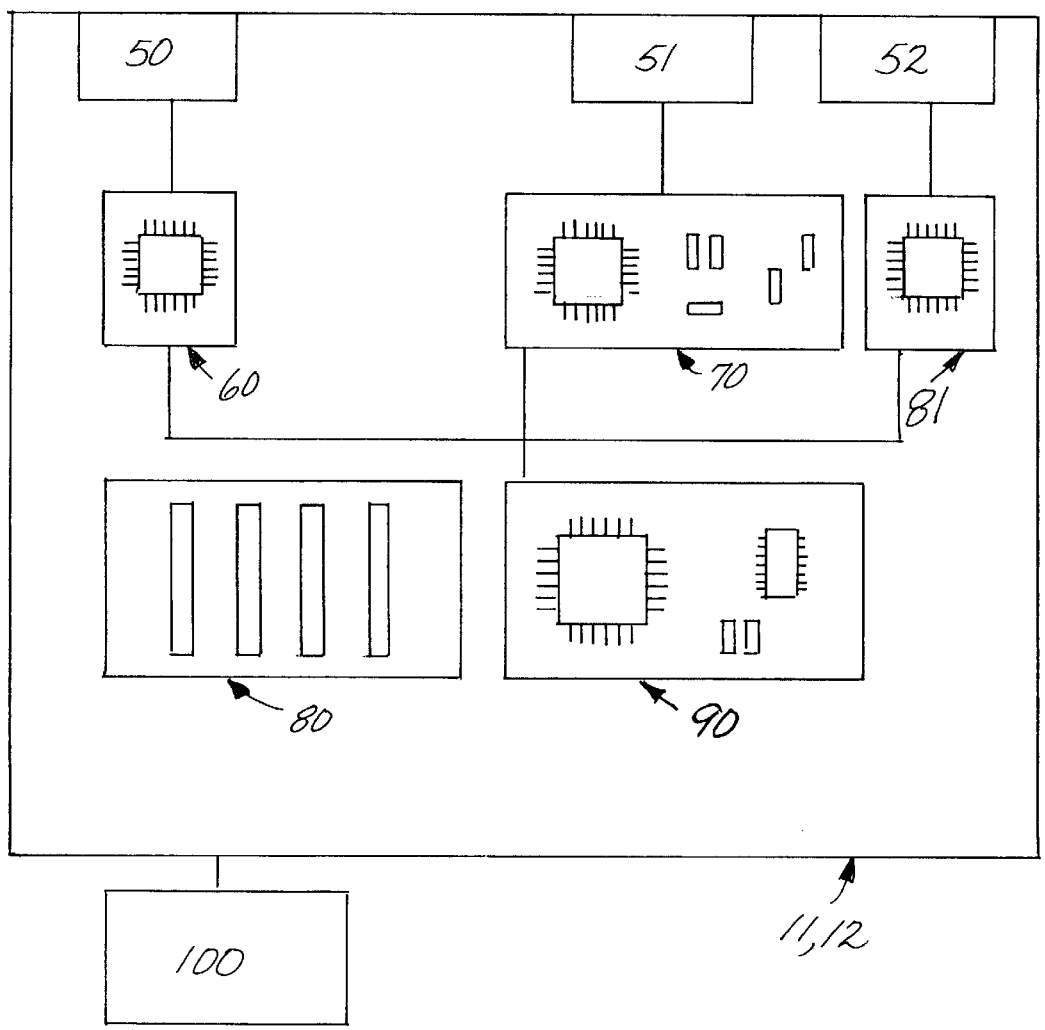
FIG. 3 is a sketch of the microcomputer system according to the invention.

Microcomputer systems 11 and 12 have their own processor systems 90, power supplies 100 and storage units 80 (see FIG. 3). This means that they are completely independent from the operational status of sender 1 and recipient 2 assigned to them respectively. For example, recipient 2 can be entirely decoupled from the second microcomputer system 12, whereby incoming electronic mail is stored and processed by the second microcomputer system 12. Intermediate storage within the data transfer network (e.g. recipient post office 32 in FIG. 1) is thus superfluous. The functions of the process according to the invention are described in conjunction with the processor system 90 of the microcomputer systems 11 and 12.

The process of data transfer is described below. If the user of sender 1 wishes to send a message to a user of recipient 2, he marks the data to be sent with the name and telephone number of recipient 2 in accordance with a prescribed format:

Name+CountryCode-CityCode-PhoneNumber e.g. Hans Meier+49-30-4019001

At a predeterminable time the microcomputer system 11, which is assigned to sender 1, dials the telephone number of recipient 2, which is given in the address, and thus connects with microcomputer system 12 of recipient 2. In the main, existing modem technology conventions are hereby used to determine the data transfer speed, communications protocols and data compression.

Once a connection has been established, a parameter exchange occurs between microcomputer systems 11 and 12. The receiving microcomputer system 12 thereby checks the address details against a predeterminable list. Addresses which are rejected (negative list) or accepted (positive list) are stored in this list.

The negative list is used to prevent the transfer of unwanted electronic mail. The positive list ensures that only a defined circle of users can transfer data to a terminal device 1 or 2. Both measures increase security against computer viruses which can, for example, also infect text files. Incoming data are only accepted from senders included in the positive list and all other data are thus rejected right at the start of the communication and disconnection then ensues.

A parameter block contains the name and telephone details which sender 1 inputs into his terminal device. Details concerning the time zone and the transfer time ensure that data transfer is only allowed at certain times. Details concerning the parameter block itself are used for data security purposes during data transfer. The data block, which is exchanged between microcomputer systems 11 and 12 during the parameter exchange, has the following structure:

| Volume of Data (Bytes) | Content of Data |
|---|---|
| 2 | Length of the parameter block |
| 15 | CountryCode-CityCode-PhoneNumber |
| 15 | Name |
| 1 | Time zone |
| 4 | Transfer time |
| 2 | Check sum for the parameter block |

After a successful parameter exchange, the sending microcomputer system 11 controls the receiving microcomputer system 12 by means of certain commands. The set of commands thereby includes the commands "receive data" and "disconnect". In alternative embodiments of the process of the invention, especially with remote control, this set of commands can also incorporate other commands.

If the receiving microcomputer system 12 is ready for data transfer, it sends a corresponding command to the sending microcomputer system 11. The data are then transmitted immediately, error-free and directly to the user without intermediate storage by a central computer. A terminal user within a larger local computer network (e.g. local area network—LAN) can thereby be clearly identified by the name (e.g. log-in name) given in the address.

An electronic mail header contains information which is used by the receiving microcomputer system 12 to control the subsequent processing of the data. In particular, the electronic mail header contains information concerning the volume and type (e.g. compressed, encoded, etc.) of mail. The header also displays information regarding the priority, in order that incoming data can be sorted by the microcomputer system according to priorities. In addition, the header contains information concerning the time zone and an indication of the time, in order that receipt of the mail can be clearly ascertained. The header also contains information about itself, in order that the integrity of the transferred data can be checked. The header of the transferred electronic mail has the following structure:

| Volume of Data (Bytes) | Description of data |
|---|---|
| 2 | Volume of the header |
| 4 | Volume of the electronic mail |
| 1 | Type of electronic mail |
| 1 | Priority indication |

-continued

| Volume of Data (Bytes) | Description of data |
|---|---|
| 1 | Time zone |
| 4 | Time indication |
| 2 | Header check sum |

If microcomputer system 12 receives an electronic mail item, an automatic acknowledgment is sent to sender 1 of the electronic mail so that there is an immediate reply confirming that the electronic mail has been correctly received by recipient 2, i.e. by microcomputer system 12, which is assigned to recipient 2.

Once the data transfer is complete, microcomputer system 11 or 12 disconnects from the telephone line.

If the local storage capacity of the receiving microcomputer system 12 is momentarily exhausted, a command is transmitted to the sending microcomputer system 11 to request data transfer at a later stage, a feature called automatic option repeat. If it is generally impossible to receive data, a notification will be sent that automatic option repeat is pointless. If any errors arise during data transfer, an error message is sent and this triggers a re-transmission of the data.

As a further security measure, microcomputer systems 11 and 12 have programs that check incoming data for viruses.

In addition, microcomputer systems 11 and 12 have a program wherein the input of data from certain senders is registered and a return call to the sender of the data automatically takes place. The return call ensures that there has not, perhaps, been a bad connection.

By means of the return call, the sender of the data is verified, e.g. by reference to the positive and negative lists. Not until verification has shown that the data is permitted (i.e. on the positive list) by the user of the receiving terminal device 2 will a communication line be established so that the data can be transferred.

It is also possible for microcomputer system 12, which is assigned to receiving terminal device 2, to retrieve the data from the sender itself, after verification. Even a sender of data who falsely used the address of a sender on a positive list would not be successful in the return call process. The identity of the sender is ascertained through the telephone number to which the sender's computer is connected.

Through the return call function, receiving terminal device 2 has full control over all data received, which considerably increases data security.

The example in FIG. 2 shows the transfer of electronic mail, according to the invention, between two terminal devices, namely between a sender 1 and a recipient 2, wherein a microcomputer system 11 or 12 is directly assigned to sender 1 and recipient 2, respectively. It is also within the spirit and scope of the invention for several microcomputer systems 11 and 12 to be assigned to a sending terminal device 1 and a receiving terminal device 2, respectively. According to a further embodiment of the invention, a microcomputer system 11 or 12 is assigned to only one terminal device 1 or 2. The process according to the invention is thus compatible with the data transfer process commonly used today. An important point is that decoupling between the operational status and data exchange/data processing must be possible with at least one of the terminal devices 1 and 2, which are involved in the data exchange.

As microcomputer systems 11 and 12 are constantly ready for use in data transfer, they can also be used for remote control of other systems. For example, they may be used to control a heater or burglar alarm system which is connected to microcomputer systems 11 and 12. Certain signals, in particular clear electronic mail, can thus be sent to microcomputer systems 11 and 12, in order to switch on or switch off a heater.

As microcomputer systems 11 and 12 can also send data, messages from systems connected to the microcomputer system can be directly transmitted to other systems. If a fault occurs in a heating system connected to microcomputer system 11 or 12, for example, a message can automatically be sent to a maintenance company. If a burglar alarm system is connected to microcomputer system 11 or 12, the police can be automatically notified when the alarm goes off.

Details regarding the condition of the system concerned can be requested from external locations through microcomputer system 11 or 12. For example, a maintenance firm can request through microcomputer system 11 or 12, a status report on the heating system from which an error message was received.

FIG. 3 shows the circuit arrangement of a microcomputer system 11 or 12 according to the invention. For the sake of simplicity, reference will generally be made only to microcomputer system 12 in the following description. Microcomputer system 12 is assigned to recipient 2, which is not illustrated here. Microcomputer system 11, which is assigned to sender 1, has the same basic structure and microcomputer systems 11 and 12 can therefore be used for both receiving and sending data. Both processes can take place simultaneously if the ISDN process is used for the transfer.

Microcomputer system 12 has interfaces 50, 51 and 52 for connection to the recipient and to the telephone network 20, neither of which is illustrated here.

The circuit arrangement of microcomputer system 12 consists mainly of four electronic components 60, 70, 80, 90, which are connected to each other and to interfaces 50, 51 and 52. An autonomous power supply 100 to microcomputer system 12 is shown in the diagram. The power supply consists, on the one hand, of a connection to a normal power supply network and, on the other hand, of a battery system which ensures power supply in the event of transport or network power failure. The installation does not include any devices that consume large amounts of energy so that microcomputer system 12 installations typically require between 0.1 W and 1 W.

Microcomputer system 12 is connected to recipient 2 over a first interface 50 and to telephone network 20 over a second interface 51. An external modem can be connected through a third interface.

The first interface 50, type RS232, is connected to a computer interface 60, which monitors and controls data transfer between recipient 2 and microcomputer system 12. In alternative embodiments of the invention, the first interface 50 can be an SCSI, infra-red, radio or parallel interface. The XModem protocol, for example, is used to control the data exchange.

A storage unit 80 is connected to a processor system 90. In the example in the diagram, there are read/write memory chips (RAM) with 4 MB of storage capacity available. There are connection points for additional memory, if required. In alternative embodiments of the invention, for example, hard disks or disk drives can also be used as additional storage units 80. It is within the spirit and scope of the invention that external storage media can be connected to microcomputer system 12, if the need arises. This is particularly advantageous in the case of extremely large quantities of data.

The processor system 90 controls the operation of the microcomputer system 12, wherein an operating system is stored within the microcomputer system 12. The operating system is capable of multi-tasking and several data transfers are thus possible at the same time. The processor system 90 can be programmed in a high-level language. In alternative embodiments of the invention, several parallel connections to the data transfer network and/or assigned terminal devices can also be provided.

Microcomputer system 12 can be programmed through the assigned terminal device 2. Programming can also take place via remote control, which is not illustrated here, e.g. by telephone or remote computer. For security reasons, it may only be possible to program part of microcomputer system 12 by remote control.

Programs stored in storage unit 80 allow the operation of microcomputer system 12 to be adapted to suit wide-ranging requirements. In particular, existing data transfer processes or offers from service providers can be used. For example, microcomputer system 12 can receive data from a sender 1 which does not have an assigned microcomputer system 11.

The microcomputer system stores programs for data compression/expansion, encoding/decoding and conversion, which are used by the processor system 90 in accordance with requirements. These programs allow the data in microcomputer system 12 to be processed irrespective of the operational status or even the presence of the assigned recipient 2.

Of particular significance are facilities for preventing unauthorized reading or manipulation of data from microcomputer system 12. In particular, a password system is used for this purpose.

In principle, microcomputer system 12 can be used as a so-called "firewall computer", which offers great protection to the assigned terminal device 2. Direct access from telephone line 20 to the assigned terminal device 2 and/or other computers connected thereto is not possible through microcomputer system 12.

Microcomputer system 12 thus functions as a type of floodgate wherein incoming data only initially reaches microcomputer system 12.

FIG. 4 shows the operation of this "floodgate principle" for microcomputer system 12 in a flow chart. If data is transferred from a data transmission line 20 to microcomputer system 12, the address of the sender of the data will be ascertained in an initial check. The initial check can, however, relate to a codeword and other criteria. If the sender is not on a negative list, the data will be stored in microcomputer system 12. If the address of the sender is on a negative list, the data will be rejected and microcomputer system 12 reports that an attempt has been made to input the data.

Once the initial check has been successful and the data has been stored in the microcomputer system, the external telephone line 20 and microcomputer system 12 disconnect. (modem rings off).

Once telephone line 20 has been disconnected from microcomputer 12, the data is subjected to a second check for viruses in microcomputer system 12. Once this check has also been successfully carried out, a connection is established with the terminal device. The data is then transmitted to this terminal device. If the second data check is negative, the data is deleted and the intended recipient receives from microcomputer system 12 a message that the data has been rejected along with an indication of the sender.

Thus there is always only one "floodgate" open: firstly the connection between telephone line 20 and microcomputer system 12; then the connection between microcomputer system 12 and the assigned terminal device 2. Due to the "floodgate" function, there is never a direct connection between the external data transmission line 20 (e.g. telephone network) and the terminal device 2. As a result, access by unauthorized parties (e.g. hackers) to terminal device 2 is absolutely impossible.

The control programs for microcomputer system 12 are stored in the ROM or EPROM and re-programming with a view to penetrating the microcomputer system 12 is thus impossible.

Due to the ever-increasing quantity of electronic mail, a program is stored in the microcomputer system 12 for filtering and sorting incoming mail. The program in microcomputer system 12 determines which data is admitted and which is not. This measure increases security considerably.

Sort criteria can, for example, be the size of the incoming electronic mail item, sender, date, subject, etc. In this way particularly large electronic mail items, for example, can be rejected by microcomputer system 12.

In particular, a list of senders whose electronic mail is admitted immediately is stored. In the case of inadmissible senders, the microcomputer system 12 automatically sends a reply to the sender, advising him that the transfer has not been successful. In certain circumstances, an alternative address is given. In other cases, electronic mail items can be automatically deleted.

Further, it is possible to agree additional secret codes with certain senders of electronic mail, so that only mail with the additional secret code is accepted by microcomputer system 12.

Microcomputer system 12 has a facility for providing data with a sender or recipient priority indication. For example, it can be ascertained from a sender priority note when certain data is to be transmitted to telephone line 20. Data can thus be sent immediately or at a predeterminable time. For example, microcomputer system 12 can automatically determine the most cost-effective time for data transmission, so that certain data are sent at particularly favorable telephone rates. Data for a particular sender can, however, also be collected over a certain period of time and then be sent together at a particularly favorable rate. This is particularly useful for the transmission of electronic mail across several time zones.

Recipient priority indications allow the processing of incoming electronic mail to be efficiently organized. Certain senders of electronic mail, for example, can generally be given a high priority indication, in order that the recipient 2 knows that it is particularly important.

Further, the microcomputer system 12 has a facility for monitoring data transfer costs. The costs arising from each item of outgoing electronic mail are thus stored so that up-to-date details of the data transfer costs actually incurred are available. The costs can also be classified according to certain categories such as certain sender addresses or transfer times. The cost details can be transmitted to the administrator of the electronic mail system on request or at specified times.

The processor system 90 is connected to an ISDN controller 70, which monitors and controls the transfer of data to telephone line 20. Management of the ISDN controller takes place over CAPI. According to alternative embodiments of the invention, microcomputer system 12 can have a modem or a combination of an ISDN connection and a modem. Data transfer to telephone line 20 takes place through the second interface 51, which is connected to ISDN controller 70. The processor 90 is also connected to the third interface 52 through an interface controller. An external modem can be connected to this third interface.

The invention is not limited to the foregoing embodiments, but many modifications and variations are possible within the spirit and the scope of the invention.

I claim:

1. A method for the automatic and direct data transfer between a first end appliance as a sender and a second end appliance as a receiver through a data line, wherein the data transfer is carried out through a micro computer system directly associated with the second end appliance, wherein the micro computer system at least one of receives, sends, stores and processes data independently of the operating state of the associated second end appliance, the method comprising:

subjecting input data coming into the micro computer system to a first check according to predeterminable first criteria prior to at least one of processing and storing;

entering the data into the micro computer system only after a positive result to the first check;

automatically interrupting the connection between the data line and micro computer system after the input data has been entered in;

processing the input data in the micro computer system according to at least one of predeterminable processing modes and a second predeterminable criteria; and transferring the data to the second end appliance associated with the micro computer system.

2. The method according to claim 1 wherein subjecting the input data to a first check includes either refusing or accepting data from predeterminable senders depending on the sender address.

3. The method according to claim 1 or 2 further comprising subjecting the input data, which has been entered, to a second check according to the second predeterminable criteria; and passing the data onto the second end appliance only after a positive result to the second check.

4. The method according to claim 3 wherein subjecting the input data to the second check includes checking the input data for computer viruses.

5. The method according to claim 1 wherein processing the data includes at least one of compressing, decompressing, coding and decoding.

6. The method according to claim 1 wherein processing the data includes processing the data according to priority.

7. The method according to claim 6 wherein processing the data includes at least one of filtering and sorting the data according to the second predeterminable criteria.

8. The method according to claim 1 further comprising denying access from the data line through the micro computer system to the second end appliance directly associated with the micro computer system, so that no continuous data transfer or access to the second end appliance is possible.

9. The method according to claim 1 further comprising providing the data coming from the first end appliance with a name and telephone number as address details for the micro computer system directly associated with the second end appliance.

10. The method according to claim 1 further comprising automatically sending notifications on receipt of data from the micro computer system.

11. The method according to claim 1 wherein processing the data stored in the micro computer system includes redirecting the data through the data line by a remote control.

12. The method according to claim 11 wherein processing includes processing only a predeterminable part of the stored data with the remote control.

13. The method according to claim 10 wherein the notifications are at least one of certificates of receipt and answers to electronic mail.

14. The method according to claim 1 further comprising registering the input data from a predeterminable sender by the micro computer system, automatically returning a call back to the sender, and transferring the data to the micro computer system only after a check on the sender details.

15. The method according to claim 1 further comprising indicating data entered into the micro computer system by at least one of a display and an acoustic signal transmitter of the micro computer system.

16. A micro computer system for the automatic and direct data transfer between a first end appliance as a sender and a second end appliance as a receiver through a data line, wherein the data transfer is carried out through the micro computer system which is directly associated with the second end appliance, wherein the micro computer system at least one of receives, sends, stores and processes data independently of the operating state of the associated second end appliance, the system comprising:

a first interface directly connecting with an end appliance;

a second interface connecting with a data line;

a processor system controlling the function of the micro computer system;

a memory element storing the transferred data, the memory element for an operating system and an operating software;

a display;

an acoustic signal transmitter for at least one of the received, sent and stored data;

a checker subjecting incoming data to a first check according to predeterminable first criteria, prior to at least one of processing and storage of the data in the micro computer system;

an interrupter that automatically breaks the connection between the data line and the micro computer system; and a processor that subjects data entered into the micro computer system to processing according to at least one of predeterminable processing modes and second predeterminable criteria, wherein a direct access, from the data line through the micro computer system to the end appliance directly associated with the micro computer system, is impossible.

17. The micro computer system according to claim 16 wherein the checker refuses or accepts incoming data depending upon a sender address.

18. The micro computer system according to claim 16 wherein the processor checks the input data for computer viruses.

19. The micro computer system according to at least one of claims 16 to 18 wherein the processing includes at least one of sorting, filtering, compression and decoding of data.

20. The micro computer system according to at least one of claims 16 to 18 wherein the processor processes the data stored in the micro computer system by remote control, and the processor operates the processing mode of the micro computer system by remote control.

21. The micro computer system according to at least one of claims 16 to 18 further comprising a notifier that automatically sends predeterminable notifications through the data line.

22. The micro computer system according to at least one of claims 16 to 18 further comprising a converter that has different transmission protocols and data formats.

23. The micro computer system according to at least one of claims 16 to 18 further comprising a device that provides data coming from the first end appliance with a name and a telephone number as address details for the second end appliance.

24. The method according to claim 1 wherein the data transfer is the transfer of electronic mail.

25. The method according to claim 7 wherein the data is filtered and sorted according to at least one of sender, size, priority information, reference, and whether the data transferred is a copy or an original.

26. The method according to claim 11 wherein the processing step of the data stored in the micro computer system includes changing a processing mode of the micro computer system by a remote control.

27. The method according to claim 12 or 26 wherein processing of the input data through the remote control operation and changing of the processing mode of the micro computer system through the remote control operation occurs only after security checks.

28. The system according to claim 21 wherein the notifications are at least one of certificates of receipt, transmission protocols and answers to electronic mail.

29. The system according to claim 22 wherein the transmission protocols and data formats are at least one of fax, language and image data.

* * * * *